(12) United States Patent
Hashimoto et al.

(10) Patent No.: US 6,599,663 B2
(45) Date of Patent: Jul. 29, 2003

(54) NEGATIVE ELECTRODE FOR LITHIUM SECONDARY BATTERY

(75) Inventors: Takuya Hashimoto, Hirakata (JP); Atsushi Fukui, Nara (JP); Mutsumi Yano, Hirakata (JP); Yasuhiko Itoh, Yawata (JP)

(73) Assignee: Sanyo Electric Co., Ltd., Osaka (JP)

( * ) Notice: Subject to any disclaimer, the term of this patent is extended or adjusted under 35 U.S.C. 154(b) by 139 days.

(21) Appl. No.: 09/800,738

(22) Filed: Mar. 8, 2001

(65) Prior Publication Data

US 2001/0031398 A1 Oct. 18, 2001

(30) Foreign Application Priority Data

Mar. 16, 2000 (JP) ........................................ 2000-074582
Jun. 20, 2000 (JP) ........................................ 2000-184005

(51) Int. Cl.[7] .............................. H01M 4/38; H01M 4/40
(52) U.S. Cl. ............................... 429/218.1; 429/231.95; 252/182.1
(58) Field of Search ........................ 429/218.1, 231.95; 252/182.1

(56) References Cited

U.S. PATENT DOCUMENTS

| | | | | |
|---|---|---|---|---|
| 4,142,028 A | * | 2/1979 | Leger et al. ............. | 429/218.1 |
| 4,996,129 A | * | 2/1991 | Tuck ........................... | 205/59 |
| 5,597,665 A | * | 1/1997 | Harada et al. .................... | 29/2 |
| 2002/0001749 A1 | * | 1/2002 | Hashimoto et al. ...... | 429/218.1 |

FOREIGN PATENT DOCUMENTS

| | | | | | |
|---|---|---|---|---|---|
| JP | 60 089 068 A | * | 5/1985 | ............ | H01M/4/46 |
| JP | B2724219 | | 3/1995 | | |
| WO | WO 91/00624 | * | 1/1991 | ............ | H01M/4/40 |

OTHER PUBLICATIONS

D. Linden "Handbook of Batteries" 1995, McGraw–Hill, Inc., pp. 36.9–36.12.*

* cited by examiner

Primary Examiner—Patrick Ryan
Assistant Examiner—Gregg Cantelmo
(74) Attorney, Agent, or Firm—Birch, Stewart, Kolasch & Birch, LLP

(57) ABSTRACT

The negative electrode of this invention includes, as a negative electrode active material, substantially amorphous aluminum alloy in the form of a powder with an average particle size of 50 μm or less represented by a composition formula, $Al_{100-x}M_x$, in which M is at least one element selected from the group consisting of La, Y, Yb, Ce, Gd, Nd, Sm, Pr, Er, Ni, Co, Cu and Fe; and $1 \leq x \leq 20$. Owing to this negative electrode, a lithium secondary battery having large discharge capacity and exhibiting very good charge-discharge cycle performance can be realized.

16 Claims, 1 Drawing Sheet

NEGATIVE ELECTRODE FOR LITHIUM SECONDARY BATTERY

BACKGROUND OF THE INVENTION

This application claims the Paris convention priority of Japanese Patent Application Nos. 2000-074582 and 2000-184005 filed on Mar. 16, 2000 and Jun. 20, 2000, respectively, which are incorporated herein by reference.

The present invention relates to a negative electrode for a lithium secondary battery, and more particularly, it relates to improvement of a negative electrode active material for the purpose of providing a negative electrode for realizing a lithium secondary battery having large discharge capacity and exhibiting very good charge-discharge cycle performance.

When a plate of metallic lithium is used as the negative electrode of a lithium secondary battery, dendritic lithium with activity is deposited during charge. The deposited lithium may react with the electrolyte so as to lower the capacity of the negative electrode or may further grow during repeated charge and discharge so as to cause internal short-circuit. When a plate of lithium-aluminum alloy prepared by electrochemically alloying lithium and crystalline aluminum is used instead of a metallic lithium plate, it is possible to suppress the reaction between lithium and the electrolyte and the growth of the dendritic lithium during repeated charge and discharge, resulting in improving the charge-discharge cycle performance. However, since the reaction rate of the electrochemical reaction (alloying reaction) between lithium and crystalline aluminum is low, the charge-discharge cycle performance cannot be largely improved.

As a negative electrode for a lithium secondary battery for further improving the charge-discharge cycle performance, a plate of lithium-aluminum alloy prepared by electrochemically alloying lithium and amorphous aluminum has been proposed (Japanese Laid-Open Patent Publication No. 63-13267/1988). According to this publication, the electrochemical reaction between lithium and amorphous aluminum is more rapidly proceeded than the electrochemical reaction between lithium and crystalline aluminum occurring in charge, and hence, the charge-discharge cycle performance can be largely improved.

As a result of examination, however, the present inventors have found the following: When a plate of lithium-aluminum alloy is used, inactive $Li_2O$ is deposited on the negative electrode because the contact area (reaction area) between the alloy and the electrolyte is small. As a result, the charge-discharge efficiency is so degraded that satisfactory discharge capacity and charge-discharge cycle performance cannot be obtained.

Accordingly, an object of the invention is providing a negative electrode for realizing a lithium secondary battery having large discharge capacity and exhibiting very good charge-discharge cycle performance.

SUMMARY OF THE INVENTION

The negative electrode for a lithium secondary battery of this invention (present electrode) includes, as a negative electrode active material, substantially amorphous aluminum alloy in the form of a powder with an average particle size of 50 $\mu$m or less represented by a composition formula, $Al_{100-x}M_x$, in which M is at least one element selected from the group consisting of La, Y, Yb, Ce, Gd, Nd, Sm, Pr, Er, Ni, Co, Cu and Fe; and $1 \leq x \leq 20$.

As a result, the present invention provides a negative electrode for realizing a lithium secondary battery having large discharge capacity and exhibiting very good charge-discharge cycle performance.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein:

Figure is a cross-sectional view of a lithium secondary battery fabricated in an embodiment.

DETAILED DESCRIPTION OF THE INVENTION

Figure 1:
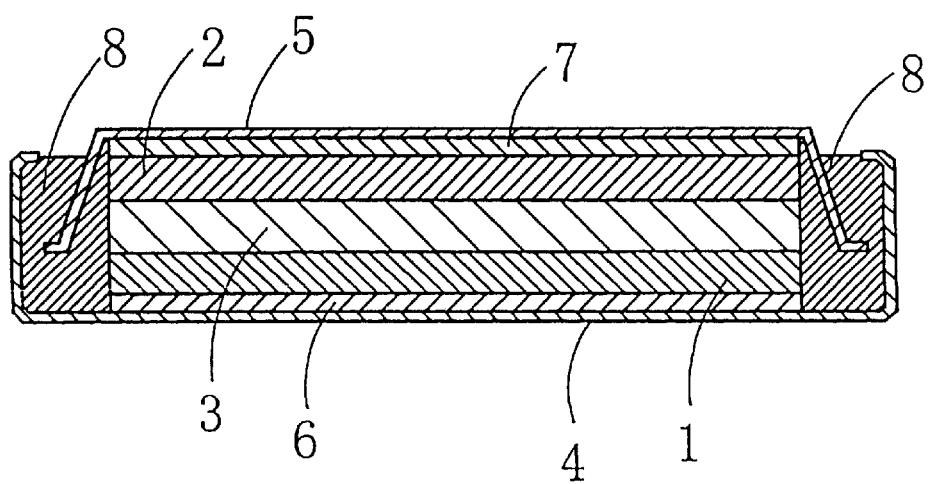

The negative electrode for a lithium secondary battery of this invention includes, as a negative electrode active material, substantially amorphous aluminum alloy in the form of a powder with an average particle size of 50 $\mu$m or less represented by a composition formula, $Al_{100-x}M_x$, in which M is at least one element selected from the group consisting of La, Y, Yb, Ce, Gd, Nd, Sm, Pr, Er, Ni, Co, Cu and Fe; and $1 \leq x \leq 20$.

The aluminum alloy used in the present electrode should be substantially amorphous for the following reason: In general, crystalline aluminum alloy is changed into a fine powder through volume change caused by insertion and release of lithium during charge and discharge. Since the change into the fine powder increases the contact resistance among alloy particles and degrades the current collecting property, the charge-discharge cycle performance tends to degrade. In contrast, amorphous aluminum alloy has high malleability and ductility and is minimally changed into a fine powder. Herein, substantially amorphous aluminum alloy means aluminum alloy whose profile obtained by the X-ray powder diffraction method includes a halo portion and whose degree A of amorphous nature defined by the following formula is 0.3 or more. As the degree of amorphous nature of a substance is larger, the substance is more amorphous.

Degree A of amorphous nature=Maximum peak intensity in halo portion in profile/Maximum peak intensity in entire profile The substantially amorphous aluminum alloy can be prepared by liquid quenching, vacuum deposition, ion plating, mechanical alloying or the like. Among these methods, the liquid quenching is preferred because it can be carried out at low cost and is suitable to mass production. The liquid quenching is quench solidification employing a roll method (including a single roll method and a double roll method) in which melted alloy obtained by heating alloy is injected onto a rapidly rotating roll or employing a gas atomizing method in which the melted alloy is atomized together with an inert gas.

The aluminum alloy used in the present electrode should be in the form of a powder because the contact area (reaction area) between the alloy and the electrolyte is so increased that higher charge-discharge efficiency can be attained by using the aluminum alloy powder than by using an aluminum alloy plate. When the aluminum alloy is in the form of a plate, the contact area between the alloy and the electrolyte is so small that the current density is increased, and hence, electrochemically inactive $Li_2O$ is deposited on the negative electrode, resulting in degrading the charge-discharge efficiency. The aluminum alloy powder used in the present electrode should have an average particle size of 50 µm or less because the powder tends to change into a fine powder when the average particle size exceeds 50 µm. The average particle size of the aluminum alloy powder is preferably 30 µm or less. A smaller average particle size is preferred, but it is generally difficult to obtain a powder with an average particle size smaller than 3 µm because of the high malleability and ductility of the aluminum alloy.

The substantially amorphous aluminum alloy used in the present electrode is represented by the composition formula, $Al_{100-x}M_x$. In the composition formula, x should be 1 or more because when x is smaller than 1, substantially amorphous aluminum alloy cannot be obtained. On the other hand, x should be 20 or less because when x exceeds 20, the content of aluminum in the alloy is too small to attain sufficient discharge capacity. Preferably, x is 3 or more and 10 or less.

In order to obtain a lithium secondary battery having large discharge capacity and exhibiting very good charge-discharge cycle performance, it is necessary not only to use the present electrode as a negative electrode but also to use a positive electrode active material with high electrochemical reversibility in the positive electrode. Examples of the positive electrode active material are lithium cobaltate ($LiCoO_2$ or the like), lithium nickelate ($LiNiO_2$ or the like), lithium manganate ($LiMnO_2$ or the like) and a mixture of two or more of these compounds.

Other features of the invention will become more apparent in the course of the following descriptions of exemplary embodiments which are given for illustration of the invention and not intended to be limiting thereof Experiment 1

The present electrodes and a comparative electrode were prepared and lithium secondary batteries were fabricated by using these electrodes, so as to examine the charge-discharge cycle performance of the batteries.

Embodiment 1

Preparation of Positive Electrode

A mixture of 80 parts by weight of a $LiCoO_2$ powder (positive electrode active material) with an average particle size of 20 µm, 10 parts by weight of acetylene black (conductive agent) and 10 parts by weight of polytetrafluoroethylene (binder) was compressedly molded into a disk with a diameter of 17 mm. Thus, a positive electrode was prepared.

Preparation of Negative Electrodes

Aluminum and each element M listed in Table 1 (having purity of 99.9 wt %) were weighed in an atomic ratio of 95:5 and mixed in a mortar, and the resultant mixture was compressedly molded and formed into an ingot by arc melting. The ingot was melted and quench solidified by the single roll method to give ribbons of alloy. The ribbons of alloy were crushed by using a pin mill in an argon atmosphere to give an alloy powder. It was confirmed through emission spectroscopy (ICP) that all the alloy powders thus prepared were represented by a composition formula, $Al_{95}M_5$, in which the atomic ratio between Al and M was 95:5. Also, the average particle size of each alloy powder measured with a laser diffraction particle size analyzer was 30 µm.

A mixture of 80 parts by weight of each alloy powder (negative electrode active material) and 20 parts by weight of polytetrafluoroethylene (binder) was compressedly molded into a disk with a diameter of 17 mm. Thus, negative electrodes (present electrodes) were prepared. All the negative electrodes included the alloy powders in the same weight.

Preparation of Electrolyte

An electrolyte was prepared by dissolving $LiPF_6$ in a concentration of 1 mol/liter in a mixed solvent of ethylene carbonate and diethyl carbonate in an equivalent volume.

Fabrication of Lithium Secondary Batteries

Flat lithium secondary batteries A1 through A14 were fabricated by using the positive electrode, each of the negative electrodes and the electrolyte. A polypropylene microporous film was used as a separator in each battery.

Figure is a schematic cross-sectional view of the thus fabricated lithium secondary battery. The lithium secondary battery A includes a positive electrode 1, a negative electrode 2, a separator 3, a positive electrode can 4, a negative electrode can 5, a positive electrode collector 6, a negative electrode collector 7, a polypropylene insulating packing 8 and the like. The positive electrode 1 and the negative electrode 2 opposing each other with the separator 3 sandwiched therebetween are housed in a battery can formed by the positive electrode can 4 and the negative electrode can 5. The positive electrode 1 is connected to the positive electrode can 4 through the positive electrode collector 6 and the negative electrode 2 is connected to the negative electrode can 5 through the negative electrode collector 7, so that the lithium secondary battery can be charged and discharged.

Comparative Example

A disk-shaped aluminum plate having a thickness of 0.3 mm and a diameter of 7.8 mm and prepared by the liquid quenching was sandwiched between two disk-shaped lithium plates each having a thickness of 0.1 mm and a diameter of 7.8 mm. Thus, a negative electrode (comparative electrode) in the shape of a disk with a thickness of 0.5 mm and a diameter of 7.8 mm was prepared. The negative electrode capacity is equal to that of the lithium secondary battery A1. A mixture of polytetrafluoroethylene (PTFE) and titanium disulfide ($TiS_2$) in a weight ratio of 0.1:99.9 was adhered onto one face of a nickel gauze, and the resultant was compressedly molded into a disk with a thickness of 0.5 mm and a diameter of 7.0 mm. Thus, a positive electrode was prepared. These negative and positive electrodes were used to fabricate a lithium secondary battery S different from the lithium secondary batteries A1 through A14 in the positive electrode and the negative electrode alone.

Charge-Discharge Cycle Performance

Each of the lithium secondary batteries A1 through A14 was subjected to a charge-discharge cycle test in each cycle of which the battery was charged to 4.1 V with 100 µA and discharged to 2.8 V with 100 µA at 25° C., so as to obtain the discharge capacity at the 10th cycle and the number of cycles run until the discharge capacity was degraded to 80% of the discharge capacity at the 1st cycle. Furthermore, the lithium secondary battery S was subjected to a charge-discharge cycle test in each cycle of which the battery was discharged to 2.8 V with 100 µA and charged to 4.1 V with 100 µA at 25° C., so as to obtain the discharge capacity at the 10th cycle and the number of cycles run until the discharge capacity was degraded to 80% of the discharge capacity at the 1st cycle. The results are shown in Table 1. Table 1 also shows the degree A of amorphous nature of the negative electrode active material (aluminum alloy or aluminum) used in each battery. The discharge capacity at the 10th cycle in Table 1 is shown as a relative index obtained by assuming the discharge capacity at the 10th cycle of the lithium secondary battery A1 as 100, and the number of cycles in Table 1 is shown as a relative index obtained by assuming the number of cycles obtained in the lithium secondary battery A1 as 100.

TABLE 1

| Battery | Element M in formula $Al_{95}M_5$ | Degree A of amorphous nature | Discharge capacity at 10th cycle | Number of cycles |
|---|---|---|---|---|
| A1 | Ce | 0.43 | 100 | 100 |
| A2 | La | 0.41 | 97 | 98 |
| A3 | Y | 0.39 | 99 | 98 |
| A4 | Yb | 0.36 | 93 | 95 |
| A5 | Gd | 0.37 | 95 | 97 |
| A6 | Nd | 0.33 | 98 | 98 |
| A7 | Sm | 0.32 | 95 | 95 |
| A8 | Pr | 0.32 | 98 | 98 |
| A9 | Er | 0.34 | 95 | 93 |
| A10 | Ni | 0.38 | 99 | 95 |
| A11 | Co | 0.36 | 98 | 93 |
| A12 | Cu | 0.31 | 95 | 90 |
| A13 | Fe | 0.34 | 98 | 92 |
| A14 | Mixture of Co & Ni in atomic ratio of 1:1 | 0.52 | 102 | 103 |
| S | — | 0.22 | 53 | 38 |

As is shown in Table 1, in the lithium secondary batteries A1 through A14 each including, as the negative electrode, the present electrode using the substantially amorphous aluminum alloy in the shape of a powder with an average particle size of 50 μm or less as the negative electrode active material, the discharge capacity at the 10th cycle is larger and the charge-discharge cycle performance is better than in the lithium secondary battery S including the comparative electrode as the negative electrode. In particular, the lithium secondary battery A14 including two kinds of substituent elements, namely, Co and Ni, exhibits the best characteristics. It seems that since the degree of amorphous nature is higher as the number of kinds of substituent elements is larger in aluminum alloy, the characteristics are much better in the lithium secondary battery A14 using the negative electrode material including the two kinds of substituent elements than in the lithium secondary batteries A1 through A13 each using the negative electrode material including merely one kind of substituent element. Accordingly, the number of kinds of substituent elements M is preferably two or more. The discharge capacity at the 10th cycle is small and the charge-discharge cycle performance is poor in the lithium secondary battery S probably because the contact area (reaction area) between the aluminum alloy (lithium-aluminum alloy) used in the negative electrode and the electrolyte is so small that electrochemically inactive $Li_2O$ is deposited on the negative electrode so as to abruptly degrade the charge-discharge efficiency. In addition, the lithium secondary battery S has the small discharge capacity at the 10th cycle and exhibits the poor charge-discharge cycle performance for the following reasons: Although the used aluminum is prepared by the liquid quenching, the degree A of amorphous nature is small because it is prepared by the liquid quenching without adding a rare earth element or a transition element to aluminum. Furthermore, titanium disulfide used as the positive electrode active material is not good at the electrochemical reversibility.

Experiment 2

The relationship between the average particle size of the aluminum alloy and the discharge capacity and the charge-discharge cycle performance was examined.

Substantially amorphous $Al_{95}Ce_5$ alloy powders respectively having average particle sizes of 3 μm, 15 μm, 50 μm and 60 μm were used as the negative electrode active materials, so as to respectively fabricate lithium secondary batteries B1 through B4 different from the lithium secondary battery A1 in the negative electrode active material alone. Subsequently, each of the batteries was subjected to the charge-discharge cycle test under the same conditions as in Experiment 1, so as to obtain the discharge capacity at the 10th cycle and the number of cycles run until the discharge capacity was degraded to 80% of the discharge capacity at the 1st cycle. The results are shown in Table 2. Table 2 also shows the degree A of amorphous nature of the negative electrode active material (aluminum alloy) used in each battery. The results obtained in the lithium secondary battery A1 listed in Table 1 are also shown in Table 2. The discharge capacity at the 10th cycle in Table 2 is shown as a relative index obtained by assuming the discharge capacity at the 10th cycle of the lithium secondary battery A1 as 100, and the number of cycles in Table 2 is shown as a relative index obtained by assuming the number of cycles obtained in the lithium secondary battery A1 as 100.

TABLE 2

| Battery | Average particle size of aluminum alloy powder (μm) | Degree A of amorphous nature | Discharge capacity at 10th cycle | Number of cycles |
|---|---|---|---|---|
| B1 | 3 | 0.43 | 99 | 100 |
| B2 | 15 | 0.43 | 99 | 100 |
| A1 | 30 | 0.43 | 100 | 100 |
| B3 | 50 | 0.43 | 94 | 94 |
| B4 | 60 | 0.43 | 68 | 66 |

As is shown in Table 2, the discharge capacity at the 10th cycle is larger and the charge-discharge cycle performance is better in the lithium secondary batteries A1 and B1 through B3 than in the lithium secondary battery B4. The discharge capacity at the 10th cycle is small and the charge-discharge cycle performance is poor in the lithium secondary battery B4 because the $Al_{95}Ce_5$ alloy powder used as the negative electrode active material is changed into a fine powder. It is understood from this result that it is necessary to use an aluminum alloy powder with an average particle size of 50 μm or less in order to obtain a negative electrode for realizing a lithium secondary battery having large discharge capacity and exhibiting very good charge-discharge cycle performance.

Experiment 3

The relationship between x in the composition formula, $Al_{100-x}M_x$, and the charge-discharge cycle performance was examined.

Substantially amorphous powders with an average particle size of 30 μm of $Al_{99.5}Ce_{0.5}$ (x=0.5), $Al_{99.0}Ce_{1.0}$ (x=1.0), $Al_{97.0}Ce_{3.0}$ (x=3.0), $Al_{90.0}Ce_{10.0}$ (x=10.0), $Al_{80.0}Ce_{20.0}$ (x=20.0) and $Al_{78.0}Ce_{22.0}$ (x=22.0) were used as the negative electrode active materials, so as to respectively fabricate lithium secondary batteries C1 through C6 different from the lithium secondary battery A1 in the negative electrode active material alone. Subsequently, each of the batteries was subjected to the charge-discharge cycle test under the same conditions as in Experiment 1, so as to obtain the discharge capacity at the 10th cycle and the number of cycles run until the discharge capacity was degraded to 80% of the discharge capacity at the 1st cycle. The results are shown in Table 3. Table 3 also shows the degree A of amorphous nature of the negative electrode active material (aluminum alloy) used in each battery. The results obtained in the lithium secondary battery A1 listed in Table 1 are also shown in Table 3. The discharge capacity at the 10th cycle in Table 3 is shown as a relative index obtained by assuming the discharge capacity at the 10th cycle of the lithium secondary battery A1 as 100, and the number of cycles in Table 3 is shown as a relative index obtained by assuming the number of cycles obtained in the lithium secondary battery A1 as 100.

TABLE 3

| Battery | x in formula $Al_{100-x}Ce_x$ | Degree A of amorphous nature | Discharge capacity at 10th cycle | Number of cycles |
| --- | --- | --- | --- | --- |
| C1 | 0.5 | 0.28 | 80 | 85 |
| C2 | 1.0 | 0.33 | 90 | 95 |
| C3 | 3.0 | 0.38 | 99 | 98 |
| A1 | 5.0 | 0.43 | 100 | 100 |
| C4 | 10.0 | 0.48 | 98 | 98 |
| C5 | 20.0 | 0.46 | 90 | 98 |
| C6 | 22.0 | 0.44 | 75 | 90 |

As is shown in Table 3, the discharge capacity at the 10th cycle is larger and the charge-discharge cycle performance is better in the lithium secondary batteries A1 and C2 through C5 according to the present invention than in the lithium secondary batteries C1 and C6 fabricated as comparative examples. It is understood from this result that x in the composition formula, $Al_{100-x}Ce_x$, of the aluminum alloy should be 1 through 20 in order to obtain a negative electrode for realizing a lithium secondary battery having large discharge capacity and exhibiting very good charge-discharge cycle performance. It was confirmed also with respect to the other elements M that x in the composition formula of the aluminum alloy should be 1 through 20.

Experiment 4

The positive electrode active material was examined.

Lithium secondary batteries D1 through D4 different from the lithium secondary battery A1 in the positive electrode active material alone were fabricated by respectively using, as the positive electrode active material, $LiNiO_2$, $LiMnO_2$, a mixture of $LiCoO_2$ and $LiNiO_2$ in a weight ratio of 1:1, and $TiS_2$ instead of $LiCoO_2$. The amounts of the positive electrode active materials to be packed were adjusted so as to equalize the initial capacity of the positive electrodes of the respective batteries. Subsequently, each of the batteries was subjected to the charge-discharge cycle test under the same conditions as in Experiment 1, so as to obtain the discharge capacity at the 10th cycle and the number of cycles run until the discharge capacity was degraded to 80% of the discharge capacity at the 1st cycle. The results are shown in Table 4. The results obtained in the lithium secondary battery A1 listed in Table 1 are also shown in Table 4. The discharge capacity at the 10th cycle in Table 4 is shown as a relative index obtained by assuming the discharge capacity at the 10th cycle of the lithium secondary battery A1 as 100, and the number of cycles in Table 4 is shown as a relative index obtained by assuming the number of cycles obtained in the lithium secondary battery A1 as 100.

TABLE 4

| Battery | Positive electrode active material | Discharge capacity at 10th cycle | Number of cycles |
| --- | --- | --- | --- |
| A1 | $LiCoO_2$ | 100 | 100 |
| D1 | $LiNiO_2$ | 97 | 99 |
| D2 | $LiMnO_2$ | 98 | 99 |
| D3 | Mixture of $LiCoO_2$ & $LiNiO_2$ in same weight ratio | 98 | 99 |
| D4 | $TiS_2$ | 62 | 53 |

As is shown in Table 4, the discharge capacity is larger and the charge-discharge cycle performance is better in the lithium secondary batteries A1 and D1 through D3 according to the present invention than in the lithium secondary battery D4 fabricated as a comparative example. The lithium secondary battery D4 is poor in its characteristics because $TiS_2$ used as the positive electrode active material is not good at the reversibility in charge and discharge. It is understood from this result that it is necessary not only to use the present electrode as the negative electrode but also to use, as a positive electrode active material, at least one lithium-transition metal composite oxide selected from the group consisting of lithium cobaltate, lithium nickelate and lithium manganese oxide in order to obtain a lithium secondary battery having large discharge capacity and exhibiting very good charge-discharge cycle performance.

Obviously, numerous modifications and variations of the present invention are possible in light of the above teachings. It is therefore to be understood that within the scope of the appended claims the invention may be practiced otherwise than as specifically described herein.

What is claimed is:

1. A negative electrode for a lithium secondary battery comprising, as a negative electrode active material, substantially amorphous aluminum alloy in the form of a powder with an average particle size of 50 μm or less represented by a composition formula, $Al_{100-x}M_x$, in which M is at least one element selected from the group consisting of La, Y, Yb, Ce, Gd, Nd, Sm, Pr, Er, Ni, Co, Cu and Fe; and $1 \leq x \leq 20$.

2. The negative electrode for a lithium secondary battery according to claim 1,
wherein the substantially amorphous aluminum alloy in the form of a powder has an average particle size of 30 μm or less.

3. The negative electrode for a lithium secondary battery according to claim 1,
wherein M in the composition formula, $Al_{100-x}M_x$, is at least two elements selected from the group consisting of La, Y, Yb, Ce, Gd, Nd, Sm, Pr, Er, Ni, Co, Cu and Fe.

4. The negative electrode for a lithium secondary battery according to claim 1,
wherein $3 \leq x \leq 10$ in the composition formula, $Al_{100-x}M_x$.

5. The negative electrode for a lithium secondary battery according to claim 1,
wherein the substantially amorphous aluminum alloy in the form of a powder has an average particle size of 30 μm or less and M in the composition formula, $Al_{100-x}M_x$, is at least two elements selected from the group consisting of La, Y, Yb, Ce, Gd, Nd, Sm, Pr, Er, Ni, Co, Cu and Fe.

6. The negative electrode for a lithium secondary battery according to claim 1, wherein the substantially amorphous aluminum alloy in the form of a powder has an average particle size of 30 μm or less and $3 \leq x \leq 10$ in the composition formula, $Al_{100-x}M_x$.

7. The negative electrode for a lithium secondary battery according to claim 1, wherein M in the composition formula, $Al_{100-x}M_x$, is at least two elements selected from the group consisting of La, Y, Yb, Ce, Gd, Nd, Sm, Pr, Er, Ni, Co, Cu and Fe and $3 \leq x \leq 10$ in the composition formula, $Al_{100-x}M_x$.

8. The negative electrode for a lithium secondary battery according to claim 1, wherein the substantially amorphous aluminum alloy in the form of a powder has an average particle size of 30 μm or less, M in the composition formula, $Al_{100-x}M_x$, is at least two elements selected from the group consisting of La, Y, Yb, Ce, Gd, Nd, Sm, Pr, Er, Ni, Co, Cu and Fe and $3 \leq x \leq 10$ in the composition formula, $Al_{100-x}M_x$.

9. A lithium secondary battery comprising a positive electrode, a negative electrode and a nonaqueous electrolyte, the positive electrode including, as a positive electrode active material, at least one lithium-transition metal composite oxide selected from the group consisting of lithium cobaltate, lithium nickelate and lithium manganate, and the negative electrode including, as a negative electrode active material, substantially amorphous aluminum alloy in the form of a powder with an average particle size of 50 μm or less represented by a composition formula, $Al_{100-x}M_x$, in which M is at least one element selected from the group consisting of La, Y, Yb, Ce, Gd, Nd, Sm, Pr, Er, Ni, Co, Cu and Fe; and $1 \leq x \leq 20$.

10. The lithium secondary battery according to claim 9, wherein the substantially amorphous aluminum alloy in the form of a powder has an average particle size of 30 μm or less.

11. The lithium secondary battery according to claim 9, wherein M in the composition formula, $Al_{100-x}M_x$, is at least two elements selected from the group consisting of La, Y, Yb, Ce, Gd, Nd, Sm, Pr, Er, Ni, Co, Cu and Fe.

12. The lithium secondary battery according to claim 9, wherein $3 \leq x \leq 10$ in the composition formula, $Al_{100-x}M_x$.

13. The lithium secondary battery according to claim 9, wherein the substantially amorphous aluminum alloy in the form of a powder has an average particle size of 30 μm or less and M in the composition formula, $Al_{100-x}M_x$, is at least two elements selected from the group consisting of La, Y, Yb, Ce, Gd, Nd, Sm, Pr, Er, Ni, Co, Cu and Fe.

14. The lithium secondary battery according to claim 9, wherein the substantially amorphous aluminum alloy in the form of a powder has an average particle size of 30 μm or less and $3 \leq x \leq 10$ in the composition formula, $Al_{100-x}M_x$.

15. The lithium secondary battery according to claim 9, wherein M in the composition formula, $Al_{100-x}M_x$, is at least two elements selected from the group consisting of La, Y, Yb, Ce, Gd, Nd, Sm, Pr, Er, Ni, Co, Cu and Fe and $3 \leq x \leq 10$ in the composition formula, $Al_{100-x}M_x$.

16. The lithium secondary battery according to claim 9, wherein the substantially amorphous aluminum alloy in the form of a powder has an average particle size of 30 μm or less, M in the composition formula, $Al_{100-x}M_x$, is at least two elements selected from the group consisting of La, Y, Yb, Ce, Gd, Nd, Sm, Pr, Er, Ni, Co, Cu and Fe and $3 \leq x \leq 10$ in the composition formula, $Al_{100-x}M_x$.

* * * * *